United States Patent
Xie et al.

(10) Patent No.: US 11,910,215 B2
(45) Date of Patent: Feb. 20, 2024

(54) INFORMATION REPORTING METHOD, INFORMATION REPORTING CONFIGURATION METHOD, USER EQUIPMENT AND NETWORK SIDE DEVICE

(71) Applicants: China Mobile Communication Co., Ltd Research Institute, Beijing (CN); China Mobile Communications Group Co., Ltd., Beijing (CN)

(72) Inventors: Fang Xie, Beijing (CN); Nan Hu, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 111 days.

(21) Appl. No.: 17/059,578

(22) PCT Filed: Apr. 28, 2019

(86) PCT No.: PCT/CN2019/084735
§ 371 (c)(1),
(2) Date: Nov. 30, 2020

(87) PCT Pub. No.: WO2019/228114
PCT Pub. Date: Dec. 5, 2019

(65) Prior Publication Data
US 2021/0219160 A1    Jul. 15, 2021

(30) Foreign Application Priority Data
May 30, 2018 (CN) .......................... 201810542410.7

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
None
See application file for complete search history.

(56) References Cited

U.S. PATENT DOCUMENTS

| 9,451,639 B2 | 9/2016 | Li et al. | |
| 2009/0270108 A1* | 10/2009 | Xu | H04W 24/10 |
| | | | 455/452.2 |

(Continued)

FOREIGN PATENT DOCUMENTS

| CN | 101827389 A | 9/2010 |
| CN | 101997658 A | 3/2011 |

(Continued)

OTHER PUBLICATIONS

Nokia, "Measurement and measurement reporting of E-UTRAN cells", 3GPP TSG-RAN WG2 Meeting #64, R2-087437, Prague, Czech Republic, Nov. 10-14, 2008.

(Continued)

*Primary Examiner* — Chi H Pham
*Assistant Examiner* — Raul Rivas
(74) *Attorney, Agent, or Firm* — Price Heneveld LLP (57) ABSTRACT

An information reporting method, an information reporting configuration method, a user equipment and a network side device are provided. The information reporting method is applied to the user equipment and includes reporting information of a frequency domain location where the user equipment is located recorded by the user equipment and/or information of a frequency domain location where the user equipment is currently located.

17 Claims, 4 Drawing Sheets reporting information of frequency domain location where the UE is located recorded by the UE and/or information of frequency domain location where the UE is currently located to the network side device

21

(56) References Cited

U.S. PATENT DOCUMENTS

| | | | |
|---|---|---|---|
| 2011/0182202 A1* | 7/2011 | Olofsson | H04J 11/0069 |
| | | | 370/252 |
| 2012/0307669 A1 | 12/2012 | Kim et al. | |
| 2014/0128057 A1* | 5/2014 | Siomina | H04W 56/00 |
| | | | 455/423 |
| 2016/0212752 A1* | 7/2016 | Xu | H04L 5/0048 |
| 2018/0109983 A1 | 4/2018 | Fukuta | |
| 2018/0139715 A1 | 5/2018 | Ly et al. | |
| 2019/0268939 A1 | 8/2019 | Yang et al. | |
| 2019/0297577 A1* | 9/2019 | Lin | H04W 52/0219 |
| 2020/0068616 A1* | 2/2020 | Qian | H04W 74/002 |
| 2020/0344595 A1* | 10/2020 | Chen | H04W 72/042 |
| 2021/0120481 A1 | 4/2021 | Cheng et al. | |

FOREIGN PATENT DOCUMENTS

| | | |
|---|---|---|
| CN | 102131207 A | 7/2011 |
| CN | 103634838 A | 3/2014 |
| CN | 106211204 A | 12/2016 |
| CN | 109644418 A | 4/2019 |
| CN | 112005574 A | 11/2020 |
| WO | 2017023229 A1 | 2/2017 |
| WO | 2018028716 A1 | 2/2018 |
| WO | 2018044116 A1 | 3/2018 |

OTHER PUBLICATIONS

"Remaining Details on Synchronization Signal" 3GPP TSG RAN WG!#90b RI-1717576, Oct. 9-13, 2017, Prague, Czech Republic.
"Remaining Details on Multiple SS Block Transmissions in Wideband CC" 3GPP TSG RAN WG1 Meeting #90 R1-1713252, Aug. 21-25, 2017, Prague, Czech Republic.

* cited by examiner sending configuration information to a UE, where the configuration information is used to configure a record of the UE and/or report information of a frequency domain location where the UE is located — 11

Fig. 1 reporting information of frequency domain location where the UE is located recorded by the UE and/or information of frequency domain location where the UE is currently located to the network side device — 21

Fig. 2 receiving the information of frequency domain location where the UE is located recorded by the UE and/or the information of frequency domain location where the UE is currently located reported by the UE — 31

INFORMATION REPORTING METHOD, INFORMATION REPORTING CONFIGURATION METHOD, USER EQUIPMENT AND NETWORK SIDE DEVICE

CROSS-REFERENCE TO RELATED APPLICATION

The present application is the U.S. national phase of PCT Application No. PCT/CN2019/084735 filed on Apr. 28, 2019, which claims a priority of the Chinese patent application No. 201810542410.7 filed on May 30, 2018, which is incorporated herein by reference in its entirety.

TECHNICAL FIELD

The present disclosure relates to the field of communication technology, in particular to an information reporting method, an information reporting configuration method, a user equipment and a network side device.

BACKGROUND

In the Long Term Evolution (LTE) system, a Minimization Drive Test (MDT) technology is used to collect relevant information about a User Equipment (UE) in an idle state and a connected state. The network side device configures the UE to collect and record measurement results of a current cell/neighboring cell (such as Reference Signal Receiving Power (RSRP) and Reference Signal Receiving Quality (RSRQ), etc.), location information of the UE (such as Radio frequency fingerprint or global positioning system (GPS) and other detailed location information), a cell identity of the current cell and/or a neighboring cell, data packet delay and log end time and other information.

On the other hand, due to the introduction of a large bandwidth of up to 400 MHz in the 5G system, gNB (a base station in the 5G system) may only send system information in a part of the frequency domain, and send synchronization signals/physical broadcast channel blocks (SS/PBCH block) for measurement in other part of frequency domain.

Since the operator may configure the same cell identity (ID) or Evolved-Universal Mobile Communication System Terrestrial Radio Access Network cell global identifier (E-UTRAN Cell Global Identifier, ECGI) for a location in the large bandwidth for sending system information and a location in the large bandwidth for not sending system information, if the UE only reports the cell ID during information reporting, the specific location of the UE in frequency domain may not be indicated by the cell ID.

SUMMARY

The present disclosure is to provide an information reporting method, an information reporting configuration method, a UE, and a network side device, so as to solve the problem in the relate art that if the UE only reports the cell ID during information reporting, the specific location of the UE in frequency domain may not be indicated by the cell ID.

In one aspect, the present disclosure provides in some embodiments an information reporting method applied to a user equipment (UE), includes: reporting information of frequency domain location where the UE is located recorded by the UE and/or information of frequency domain location where the UE is currently located to the network side device.

Optionally, before the reporting information of frequency domain location where the UE is located recorded by the UE to the network side device, the method further includes: reporting the recorded information of frequency domain location where the UE is located to the network side device through uplink signaling, the uplink signaling being a radio resource control (RRC) message, or a medium access control (MAC) message, or other messages other than the RRC message and the MAC message; or reporting the recorded information of frequency domain location where the UE is located to the network side device after the UE enters a connected state from an idle state or an inactive state, or in a procedure of transitioning to the connected state.

Optionally, before the reporting information of frequency domain location where the UE is located recorded by the UE and/or information of frequency domain location where the UE is currently located to the network side device, the method further includes: obtaining measurement information through measurement; the reporting information of frequency domain location where the UE is located recorded by the UE and/or information of frequency domain location where the UE is currently located to the network side device includes: reporting the information of frequency domain location where the UE is located recorded by the UE and/or the information of frequency domain location where the UE is currently located to the network side device, and reporting the measurement information.

Optionally, the measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, before the reporting information of frequency domain location where the UE is located recorded by the UE and/or information of frequency domain location where the UE is currently located to the network side device, the method further includes: receiving configuration information sent by the network side device, wherein the configuration information is used to configure the UE to record and/or report the information of frequency domain location where the UE is located.

Optionally, the reporting the information of frequency domain location where the UE is located recorded by the UE to the network side device includes: receiving first report request information from the network side device, wherein the first report request information is used to notify the UE to report the information of frequency domain location where the UE is located recorded by the UE; sending the information of frequency domain location where the UE is located recorded by the UE to the network side device according to the first report request information.

Optionally, the reporting the information of frequency domain location where the UE is located recorded by the UE to the network side device includes: actively reporting the information of frequency domain location where the UE is located recorded by the UE to the network side device.

Optionally, the reporting the information of frequency domain location where the UE is located recorded by the UE to the network side device includes: sending a notification message to the network side device, the notification message is used to inform the network side device that the UE has recorded the information of frequency domain location where the UE is located; receiving second report request information sent by the network side device according to the notification message, wherein the second report request information is used to notify the UE to report the information of frequency domain location where the UE is located recorded by the UE; sending the information of frequency domain location where the UE is located recorded by the UE to the network side device according to the second report request information.

In another aspect, an information reporting method applied to a network side device, includes: receiving information of frequency domain location where a UE is located recorded by the UE and/or information of frequency domain location where the UE is currently located reported by the UE.

Optionally, the receiving the information of frequency domain location where the UE is located recorded by the UE and reported by the UE includes: sending first report request information to the UE, wherein the first report request information is used to notify the UE to report the information of frequency domain location where the UE is located recorded by the UE; receiving the information of frequency domain location where the UE is located recorded by the UE and reported by the UE according to the first report request information.

Optionally, the receiving the information of frequency domain location where the UE is located recorded by the UE and reported by the UE includes: receiving the information of frequency domain location recorded by the UE actively reported by the UE.

Optionally, the receiving the information of frequency domain location where the UE is located recorded by the UE and reported by the UE includes: receiving a notification message sent by the UE, wherein the notification message is used to inform the network side device that the UE has recorded the information of frequency domain location where the UE is located; sending second report request information to the UE according to the notification message, wherein the second report request information is used to notify the UE to report the information of frequency domain location recorded by the UE; receiving the information of frequency domain location recorded by the UE and sent by the UE according to the second report request information.

Optionally, the receiving the information of frequency domain location where the UE is located recorded by the UE and reported by the UE and/or the information of frequency domain location where the UE is currently located includes: receiving the information of frequency domain location where the UE is located recorded by the UE and reported by the UE and/or the information of frequency domain location where the UE is currently located and the measurement information reported by the UE.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

In another aspect, an information reporting configuration method applied to a network side device, includes: sending configuration information to a UE, wherein the configuration information is used to configure the UE to record and/or report information of frequency domain location where the UE is located.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, the configuration information is further used to configure the UE to record and/or report measurement information obtained by the UE through measurement.

Optionally, the measurement information comprises at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

In another aspect, a user equipment (UE), includes: a transceiver, configured to report information of frequency domain location where the UE is located recorded by the UE and/or information of frequency domain location where the UE is currently located to the network side device.

Optionally, the UE further includes a processor, configured to record the information of frequency domain location where the UE is located when the UE is in an idle state or an inactive state; the transceiver is configured to report the recorded information of frequency domain location where the UE is located to the network side device through uplink signaling, the uplink signaling is a RRC message, or a MAC message, or other messages other than the RRC message and the MAC message; or report the recorded information of frequency domain location where the UE is located to the network side device after the UE enters the connected state from the idle state or the inactive state, or in the procedure of transitioning to the connected state.

Optionally, the UE further includes a processor for obtaining measurement information through measurement, wherein the transceiver is configured to report the information of frequency domain location where the UE is located recorded by the UE and/or the information of frequency domain location where the UE is currently located to the network side device, and reporting the measurement information.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, the transceiver is further configured to: receive configuration information sent by the network side device, wherein the configuration information is used to configure the UE to record and/or report the information of frequency domain location where the UE is located.

Optionally, the transceiver is configured to receive first report request information from the network side device, wherein the first report request information is used to notify the UE to report the information of frequency domain location where the UE is located recorded by the UE; and send the information of frequency domain location where the UE is located recorded by the UE to the network side device according to the first report request information.

Optionally, the transceiver is configured to actively report the information of frequency domain location where the UE is located recorded by the UE to the network side device.

Optionally, the transceiver is configured to send a notification message to the network side device, the notification message is used to inform the network side device that the UE has recorded the information of frequency domain location where the UE is located; receive second report request information sent by the network side device according to the notification message, wherein the second report request information is used to notify the UE to report the information of frequency domain location where the UE is located recorded by the UE; send the information of frequency domain location where the UE is located recorded by the UE to the network side device according to the second report request information.

In another aspect, a network side device, includes: a transceiver, configured to receive information of frequency domain location where a UE is located recorded by the UE and/or information of frequency domain location where the UE is currently located reported by the UE.

Optionally, the transceiver is configured to send first report request information to the UE, wherein the first report request information is used to notify the UE to report the information of frequency domain location where the UE is located recorded by the UE; receive the information of frequency domain location where the UE is located recorded by the UE and reported by the UE according to the first report request information.

Optionally, the transceiver is configured to receive the information of frequency domain location recorded by the UE actively reported by the UE.

Optionally, the transceiver is configured to receive a notification message sent by the UE, wherein the notification message is used to inform the network side device that the UE has recorded the information of frequency domain location where the UE is located; send second report request information to the UE according to the notification message, wherein the second report request information is used to notify the UE to report the information of frequency domain location recorded by the UE; receive the information of frequency domain location recorded by the UE and sent by the UE according to the second report request information.

Optionally, the transceiver is configured to receive the information of frequency domain location where the UE is located recorded by the UE and reported by the UE and/or the information of frequency domain location where the UE is currently located and the measurement information reported by the UE.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

In another aspect, a network side device, includes: a transceiver, configured to send configuration information to a UE, wherein the configuration information is used to configure the UE to record and/or report information of frequency domain location where the UE is located.

Optionally, the information of frequency domain location is at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, the configuration information is further used to configure the UE to record and/or report measurement information obtained by the UE through measurement.

In another aspect, an embodiment of the present disclosure provides a UE, including a processor, and a memory storing therein a computer program, wherein the computer program is executed by the processor so as to implement the information reporting method.

In another aspect, an embodiment of the present disclosure provides a network side device, comprising a processor, and a memory storing therein a computer program, wherein the computer program is executed by the processor so as to implement the information reporting method or information reporting configuration method.

In another aspect, an embodiment of the present disclosure provides a computer-readable storage medium storing therein an instruction, wherein the instruction is executed by a computer, so as to implement the information reporting method, or implement the information reporting configuration method.

The embodiments of the present disclosure have the following beneficial effects: the information of the frequency domain location where the UE is located is recorded when the UE is in an idle or inactive state, then the recorded information of the frequency domain location is reported. When the UE is in the connected state, the information of the frequency domain location where the UE is located may be reported directly. Although the UE does not report the specific information of the frequency domain location where the UE is located, the base station can also obtain an approximate frequency domain location where the UE is located. However, for an ultra-large bandwidth cell, a more accurate frequency domain location can be obtained through the recording and reporting by the UE, which can further facilitate the network to understand the specific location where coverage and load related issues occur.

DETAILED DESCRIPTION

In order to make the objectives, technical solutions, and advantages of the embodiments of the present disclosure clearer, the technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by a person of ordinary skill in the art fall within the protection scope of the present disclosure.

Figure 1:
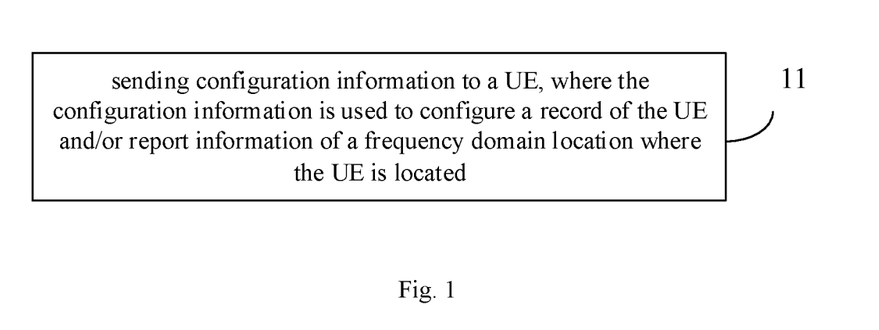
FIG. 1 is a flowchart of an information reporting configuration method according to one embodiment of the present disclosure.

FIG. 1 is a flowchart of an information reporting configuration method according to an embodiment of the present disclosure. The method is applied to a network side device and includes the following steps.

Step 11: sending configuration information to a UE, where the configuration information is used to configure the UE to record and/or report information of a frequency domain location where the UE is located.

The information reporting configuration method provided by the embodiments of the present disclosure configures the UE to record and/or report the information of the frequency domain location where the UE is located. Specifically, the information of the frequency domain location where the UE is located is recorded when the UE is in an idle or inactive state, then the recorded information of the frequency domain location is reported. When the UE is in the connected state, the information of the frequency domain location where the UE is located may be reported directly. Although the UE does not report the specific information of the frequency domain location where the UE is located, the base station can also obtain an approximate frequency domain location where the UE is located. However, for an ultra-large bandwidth cell, a more accurate frequency domain location can be obtained through the recording and reporting by the UE, which can further facilitate the network to understand the specific location where coverage and load related issues occur.

The above information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of a sending location of RMSI, an offset relative to the start location of the sending location of RMSI, Absolute Radio Frequency Channel Number (ARFCN) of frequency domain location, Enhanced Absolute Radio Frequency Channel Number (E-ARFCN) of frequency domain location, and an offset relative to a sending location of Channel State Information Reference Signal (CSI-RS). The offset relative to the sending location of CSI-RS may be an offset relative to a sending location of any CSI-RS sent by the UE when the UE is in the connected state.

The difference between the above-mentioned various information used to indicate the frequency domain location is mainly that the accuracy and the cost for indicating the location are different, and the actual selection can be weighed according to the needs. For example, the accuracy for indicating the frequency domain location information using ARFCN or E-ARFCN can be up to tens of KHz, but 16 bit is required. For a New Radio (NR) system, due to the introduction of high frequency, more bits are required and the overhead is larger.

In addition, the process of configuring the UE by the network side device is optional. When recording and/or reporting the frequency domain location information of the UE is a default configuration of the UE, there is no need to configure the UE. When recording and/or reporting the frequency domain location information of the UE is not a default configuration of the UE, the UE needs to be configured for that. This configuration may only be effective for a UE in certain large-bandwidth cells.

In other embodiments, the configuration information is also used to configure the UE to record and/or report measurement information obtained by the UE through measurement. That is, the UE may record the measurement information and the information of frequency domain location where the UE is located at the same time, and then carry the information of frequency domain location when reporting the measurement information.

The foregoing measurement information in the embodiments of the present disclosure may include at least one of: a cell identity of a current cell and/or a neighboring cell; a cell measurement result of the current cell and/or the neighboring cell that may specifically include RSRP and RSRQ, etc.; location information of the UE that may specifically include detailed location information such as radio frequency fingerprints and GPS; a time stamp for recording the measurement information; a data packet delay; a log end time; a number of transmitted preambles.

The above measurement information is configurable by the network side device, and the network side device can be configured to measure part or all of the measurement information. During specific implementation, the UE can also be configured to measure other information as needed.

Figure 2:
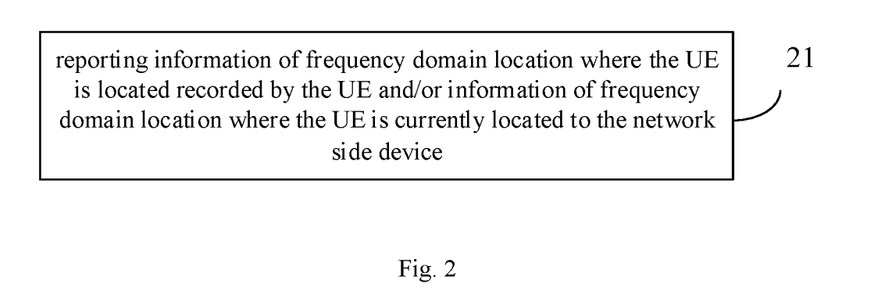
FIG. 2 is a flowchart of an information reporting method according to one embodiment of the present disclosure.

FIG. 2 is a flowchart of an information reporting method according to an embodiment of the present disclosure. The method is applied to a UE and includes the following steps.

Step 21: reporting information of frequency domain location where the UE is located recorded by the UE and/or information of frequency domain location where the UE is currently located to the network side device.

The information reporting method provided by the embodiments of the present disclosure records the information of frequency domain location where the UE is located when the UE is in an idle state or in an inactive state, and then reports the recorded frequency domain location information actively or according to the needs of the network side device. When the UE is in a connected state, it can directly report the information of frequency domain location where the UE currently located. Although the UE does not record and report its specific frequency domain location information, the base station can also obtain its approximate frequency domain location, but for ultra-large bandwidth cells, a more accurate frequency domain location can be obtained through the recording and reporting of the UE, which can further help the network understand the specific location where coverage and load related issues occur.

In the embodiments of the present disclosure, there are various specific processes for reporting the information of frequency domain location information recorded by the UE and/or the information of frequency domain location where the UE is currently located to the network side device, which will be described below with examples.

As one of the optional specific implementations, when the UE is in the connected state, the information of frequency domain location where the UE is currently located is directly reported to the network side device.

As another optional specific implementation:

Before step 21, that is, before the step of reporting the information of frequency domain location where the UE is located recorded by the UE to the network side device, the method further includes: when the UE is in an idle state or an inactive state, recording the information of frequency domain location where the UE is located.

The above step 21 includes, that is, the step of reporting the information of frequency domain location where the UE is located recorded by the UE to the network side device includes: reporting the recorded information of frequency domain location where the UE is located to the network side device through uplink signaling, the uplink signaling being a radio resource control (RRC) message, or a medium access control (MAC) message, or other messages other than the RRC message and the MAC message; or reporting the recorded information of frequency domain location where the UE is located to the network side device when the UE enters the connected state from the idle state or the inactive state, or in the procedure of transitioning to the connected state.

The frequency domain location when the UE is in the idle or inactive state may not be the same as the frequency domain location when the UE is in the connected state. The frequency domain location where the UE is located when the UE is in the idle or inactive state may change, and the frequency domain location where the UE is located when the UE is in the connected state may change. In the embodiments of the present disclosure, the UE may report the information of frequency domain location where the UE is located when the UE is in an idle state or in an inactive state, or the information of frequency domain location where the UE is located when the UE enters into the connected state, or both of them. Therefore, when the UE is in the connected state, it can directly report the information of frequency domain location where the UE is currently located. When the UE is in the idle state or inactive state, it needs to record the information of frequency domain location where the UE is located first, and then report the recorded information of frequency domain location where the UE is located to the network side device using an existing or a newly defined RRC message or MAC message or other messages. Or, after the UE enters into the connected state or in the process of transiting to the connected state, the recorded information of frequency domain location is reported. The RRC message may be an RRC connection establishment request message, an RRC connection reconfiguration complete message, and the like.

In other disclosed embodiments, before the above step 21, that is, the step of reporting the information of frequency domain location where the UE is located recorded by the UE and/or the information of frequency domain location information where the UE is currently located to the network side device, the method further includes: obtaining measurement information through measurement.

The above step 21 includes, that is, the step of the step of reporting the information of frequency domain location where the UE is located recorded by the UE and/or the information of frequency domain location information where the UE is currently located to the network side device includes: reporting the information of frequency domain location where the UE is located recorded by the UE and/or the information of frequency domain location where the UE is currently located to the network side device, and reporting the measurement information.

The above-mentioned measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

In the embodiments of the present disclosure, the measurement information obtained by the UE through measurement can be reported as needed. When the measurement information needs to be reported, the frequency domain location information of the UE can be carried when the measurement information is reported, or when the measurement information does not need to be reported, the frequency domain location information of the UE is reported separately. In addition, the measurement information that needs to be reported may be all or part of the above-mentioned measurement information, or other information other than the above-mentioned measurement information.

Specifically, the above information of frequency domain location may be represented by many ways, for example may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

When the UE is in an idle state or an inactive state, the above information other than the offset relative to the sending location of a certain CSI-RS can be used to indicate the frequency domain location of the UE. When the UE is in the connected state, any one of all the above information can be used to indicate the frequency domain location of the UE.

In addition, the difference between the above-mentioned various information used to indicate the frequency domain location is mainly that the accuracy and the cost for indicating the location are different, and the actual selection can be weighed according to the needs. For example, the accuracy for indicating the frequency domain location information using ARFCN or E-ARFCN can be up to tens of KHz, but 16 bit is required.

Optionally, before the step of reporting the information of frequency domain location where the UE is located recorded by the UE and/or the information of frequency domain location information where the UE is currently located to the network side device, that is, before step 21, the method further includes: receiving configuration information sent by the network side device, where the configuration information is used to configure the UE to record and/or report the information of frequency domain location where the UE is located.

In addition, the step of receiving the configuration by the network side device is optional. When the above configuration is a default configuration of the UE, there is no need to receive the configuration by the network side device. When recording and/or reporting the information of frequency domain location where the UE is located is not a default configuration of the UE, the configuration step is necessary. This configuration may only be effective for a UE in certain large-bandwidth cells.

In the embodiment of the present disclosure, there are various specific processes for the UE to report the recorded information of frequency domain location to the network side device, which will be described below with examples.

In an optional implementation, the step of reporting the information of frequency domain location where the UE is located recorded by the UE to the network side device includes: actively reporting the information of frequency domain location where the UE is located recorded by the UE to the network side device.

That is, when the UE is in the idle state, inactive state, or connected state, or in the procedure of transitioning to the connected state, it can actively report the information to the network side device. In addition to the frequency domain location information, the information actively reported by the UE may also include one or more of the measurement information recorded by the UE.

In the above method for the UE to report information to the network side device, the UE actively reports the frequency domain location information and/or measurement information recorded by the UE in a timely manner, but the network side device may only need part of the information reported by the UE, or does not need the information reported by the UE temporarily, the timely reporting behavior of the UE may result in a waste of communication resources or increase the processing burden of the network side device.

In a second optional implementation, the step of reporting the information of frequency domain location where the UE is located recorded by the UE to the network side device includes the following steps.

The first step: receiving first report request information from the network side device, where the first report request information is used to notify the UE to report the information of frequency domain location where the UE is located recorded by the UE.

The second step: sending the information of frequency domain location where the UE is located recorded by the UE to the network side device according to the first report request information.

That is, when the UE is in the idle state, inactive state, or connected state, or in the procedure of transitioning the connected state, the UE can report information according to the request of the network side device (first report request information). In addition to the information of frequency domain location where the UE is located recorded by the UE, the information requested by the network side device may also include one or more of the measurement information recorded by the UE.

For the method for the UE to report information according to the request of the network side device, although its promptness is worse than that of the method of actively reporting by the UE, but it can report information according to the needs of the network side device, which can avoid the waste of communication resources caused by reporting information that is not required by the network side device, and reduce the data processing burden on the network side device.

In a third optional implementation, the step of reporting the information of frequency domain location where the UE is located recorded by the UE to the network side device includes the following steps.

The first step: sending a notification message to the network side device, the notification message is used to inform the network side device that the UE has recorded the information of frequency domain location where the UE is located.

The second step: receiving second report request information sent by the network side device according to the notification message, where the second report request information is used to notify the UE to report the information of frequency domain location where the UE is located recorded by the UE.

The third step: sending the information of frequency domain location where the UE is located recorded by the UE to the network side device according to the second report request information.

That is, when the UE is in the idle state, inactive state, or connected state, or in the procedure of transitioning to the connected state, it can actively inform the network side device that the UE has related log information, the related log information records the information of frequency domain location where the UE is located when the UE is in the idle state or in the inactive state, then the information requested by the network side device is sent upon the request of the network side device. Except for the information of the frequency domain location where the UE is located, the information requested by the network side device may also include one or more of the measurement information recorded by the UE.

In this embodiment, the network side device may not know whether the UE has recorded the information of frequency domain location and/or the measurement information. Therefore, the UE needs to inform the network side device that it has relevant records, and then the network side device then requests (through the second report request information) the UE to report the information as needed.

Figure 3:
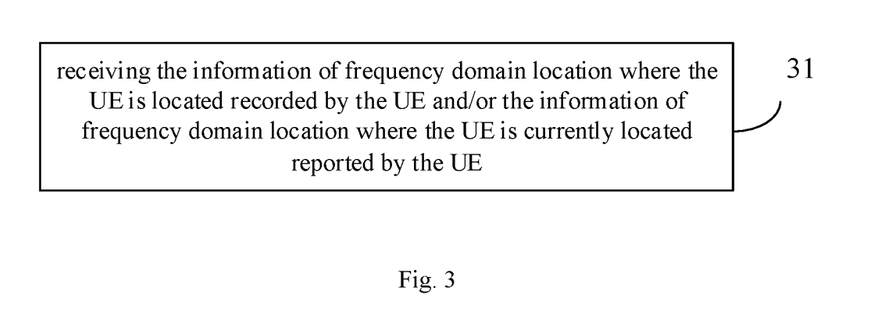
FIG. 3 is another flowchart of an information reporting method according to one embodiment of the present disclosure.

FIG. 3 is a flowchart of an information reporting method provided by an embodiment of the present disclosure. The method is applied to a network side device and corresponds to the information reporting method applied to a UE in the above embodiment, the method includes the following steps.

Step 31: receiving the information of frequency domain location where the UE is located recorded by the UE and/or the information of frequency domain location where the UE is currently located reported by the UE.

In the embodiments of the present disclosure, the network side device may be a base station, a core network device, a network management device, a trace collection entity (TCE), etc., and receive the specific information of frequency domain location where the UE is located reported by the UE, a more accurate frequency domain location may be indicated for a cell with a ultra-large bandwidth. It can further help the network understand the specific location of coverage and load related issues.

In the embodiments of the present disclosure, there are various specific processes for receiving the information of frequency domain location where the UE is located recorded by the UE and/or the information of frequency domain location where the UE is currently located reported by the UE, which are described below with examples.

One of the optional implementation, step 31, that is, the step of receiving the information of frequency domain location where the UE is located recorded by the UE and reported by the UE includes: receiving the information of frequency domain location recorded by the UE actively reported by the UE.

In this embodiment, when the UE is in the idle state, inactive state, or connected state, or in the procedure of transitioning to the connected state, it can actively report the recorded information of frequency domain location to the network side device or actively report the recorded information of frequency domain location and the measurement information to the network side device in a timely manner, but the network side device may only need part of the information reported by the UE, or does not need the information reported by the UE temporarily, the receiving reported information by the network side device may result in a waste of communication resources or increase the processing burden of the network side device.

In a second optional implementation, step 31, that is, the step of receiving the information of frequency domain location where the UE is located recorded by the UE and reported by the UE includes: sending first report request information to the UE, where the first report request information is used to notify the UE to report the information of frequency domain location where the UE is located recorded by the UE; receiving the information of frequency domain location where the UE is located recorded by the UE and reported by the UE according to the first report request information.

In this embodiment, for the method for the UE to report information according to the request (first report request information) of the network side device, although its promptness is worse than that of the method of actively reporting by the UE, but it can report information according to the needs of the network side device, which can avoid the waste of communication resources caused by reporting information that is not required by the network side device, and reduce the data processing burden on the network side device.

In a third optional implementation, the above step 31, that is, the step of receiving the information of frequency domain location where the UE is located recorded by the UE and reported by the UE according to the first report request information includes: receiving a notification message sent by the UE, where the notification message is used to inform the network side device that the UE has recorded the information of frequency domain location where the UE is located; sending second report request information to the UE according to the notification message, where the second report request information is used to notify the UE to report the information of frequency domain location recorded by the UE; receiving the information of frequency domain location recorded by the UE and sent by the UE according to the second report request information.

In this embodiment, the network side device may not know whether the UE has recorded the information of frequency domain location and/or measurement information. Therefore, the UE needs to inform the network side device that it has related records, and then the network side device requests the UE to report the information as needed.

Specifically, when the network side device needs not only the frequency domain location information of the UE but also the measurement information recorded by the UE, the above step 31, that is, the step of receiving the information of frequency domain location where the UE is located recorded by the UE and reported by the UE and/or the information of frequency domain location where the UE is currently located includes: receiving the information of frequency domain location where the UE is located recorded by the UE and reported by the UE and/or the information of frequency domain location where the UE is currently located and the measurement information reported by the UE. The measure information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Specifically, the above information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS. The difference between the above-mentioned various information used to indicate the frequency domain location is mainly that the accuracy and the cost of indicating the location are different, and the actual selection can be weighed according to needs.

Figure 4:
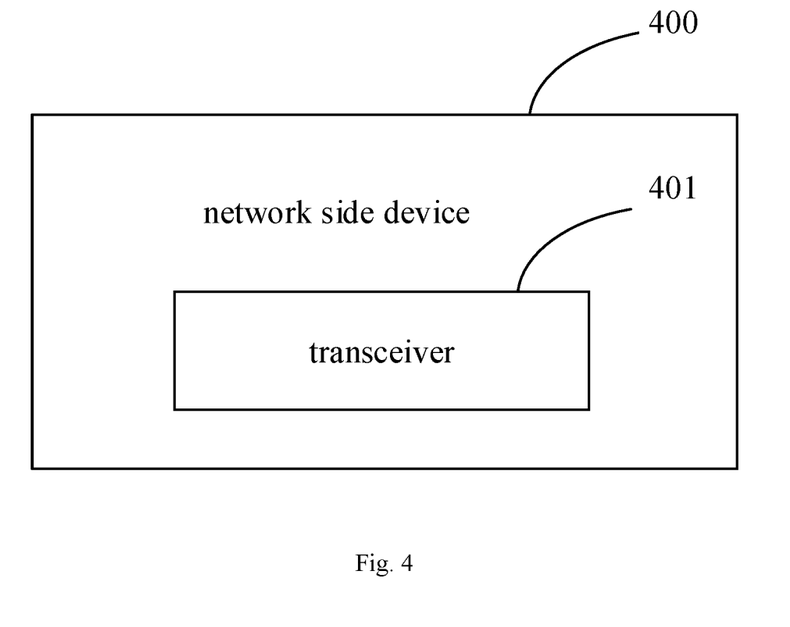
FIG. 4 is a schematic view showing a network side device according to one embodiment of the present disclosure.

FIG. 4 is a schematic structural diagram of a network side device according to an embodiment of the present disclosure. The network side device 400 includes: a transceiver 401, configured to send configuration information to a UE, where the configuration information is used to configure a record of the UE and/or report information of a frequency domain location where the UE is located.

In the embodiment of the present disclosure, the UE is configured to record and/or report the information of the frequency domain location where the UE is located. That is, the information of the frequency domain location where the UE is located is recorded when the UE is in an idle or inactive state, then the recorded information of the frequency domain location is reported. When the UE is in the connected state, the information of the frequency domain location where the UE is located may be reported directly. Although the UE does not record and report the specific information of the frequency domain location where the UE is located, the base station can also obtain an approximate frequency domain location where the UE is located. However, for an ultra-large bandwidth cell, a more accurate frequency domain location can be obtained through the recording and reporting by the UE, which can further facilitate the network to understand the specific location where coverage and load related issues occur.

Specifically, the information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of a sending location of RMSI, an offset relative to the start location of the sending location of RMSI, Absolute Radio Frequency Channel Number (ARFCN) of frequency domain location, Enhanced Absolute Radio Frequency Channel Number (E-ARFCN) of frequency domain location, and an offset relative to a sending location of Channel State Information Reference Signal (CSI-RS).

In other embodiments, the configuration information is also used to configure the UE to record and/or report the measurement information obtained by the UE through measurement.

The foregoing measurement information in the embodiments of the present disclosure may include at least one of: a cell identity of a current cell and/or a neighboring cell; a cell measurement result of the current cell and/or the neighboring cell that may specifically include RSRP and RSRQ, etc.; location information of the UE that may specifically include detailed location information such as radio frequency fingerprints and GPS; a time stamp for recording the measurement information; a data packet delay; a log end time; a number of transmitted preambles.

The network side device provided in this embodiment is based on the same concept as the above embodiment. Therefore, please refer to the above embodiment for the specific working process, principle and beneficial effects, which will not be repeated herein.

Figure 5:
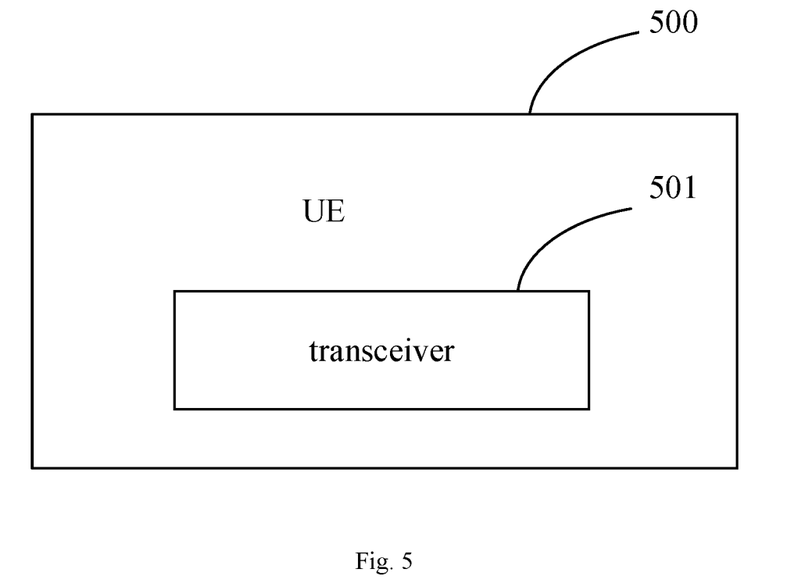
FIG. 5 is a schematic view showing a UE according to one embodiment of the present disclosure.

FIG. 5 is a schematic structural diagram of a UE according to an embodiment of the present disclosure. The UE 500 includes: a transceiver 501, configured to report information of frequency domain location where the UE is located recorded by the UE and/or information of frequency domain location where the UE is currently located to the network side device.

In the embodiment of the present disclosure, when the UE is in an idle state or in an inactive state, the information of frequency domain location where the UE is located is recorded, and then the recorded information of frequency domain location is reported. When the UE is in a connected state, it can directly report the information of frequency domain location where the UE currently located. Although the UE does not record and report its specific frequency domain location information, the base station can also obtain its approximate frequency domain location, but for ultra-large bandwidth cells, a more accurate frequency domain location can be obtained through the recording and reporting of the UE, which can further help the network understand the specific location where coverage and load related issues occur.

In one of the implementation manners, the UE further includes a processor, configured to record the information of frequency domain location where the UE is located when the UE is in an idle state or an inactive state; the transceiver 501 is configured to report the recorded information of frequency domain location where the UE is located to the network side device through uplink signaling, the uplink signaling being a radio resource control (RRC) message, or a medium access control (MAC) message, or other messages other than the RRC message and the MAC message; or report the recorded information of frequency domain location where the UE is located to the network side device when the UE enters the connected state from the idle state or the inactive state, or in the procedure of transitioning to the connected state.

In other embodiments, the UE further includes a processor for obtaining measurement information through measurement.

The transceiver 501 is configured to report the information of frequency domain location where the UE is located recorded by the UE and/or the information of frequency domain location where the UE is currently located to the network side device, and reporting the measurement information. The above-mentioned measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Specifically, the above information of frequency domain location may be represented by many ways, for example may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, the transceiver 501 is further configured to receive configuration information sent by the network side device, where the configuration information is used to configure the UE to record and/or report the information of frequency domain location where the UE is located.

In an optional implementation, the transceiver 501 is configured to receive first report request information from the network side device, the first report request information is used to notify the UE to report the information of frequency domain location recorded by the UE, and send the frequency domain location information recorded by the UE to the network side device according to the first report request information.

In a second optional implementation, the transceiver 501 is configured to actively report the information of frequency domain location where the UE is located recorded by the UE to the network side device.

In a third optional implementation, the transceiver 501 is configured to send a notification message to the network side device, the notification message is used to inform the network side device that the UE has recorded the information of frequency domain location where the UE is located; receive second report request information sent by the network side device according to the notification message, where the second report request information is used to notify the UE to report the information of frequency domain location where the UE is located recorded by the UE; send the information of frequency domain location where the UE is located recorded by the UE to the network side device according to the second report request information.

The UE provided in this embodiment is based on the same concept as the above embodiment. Therefore, please refer to the above embodiment for the specific working process, principle and beneficial effects, which will not be repeated herein.

Figure 6:
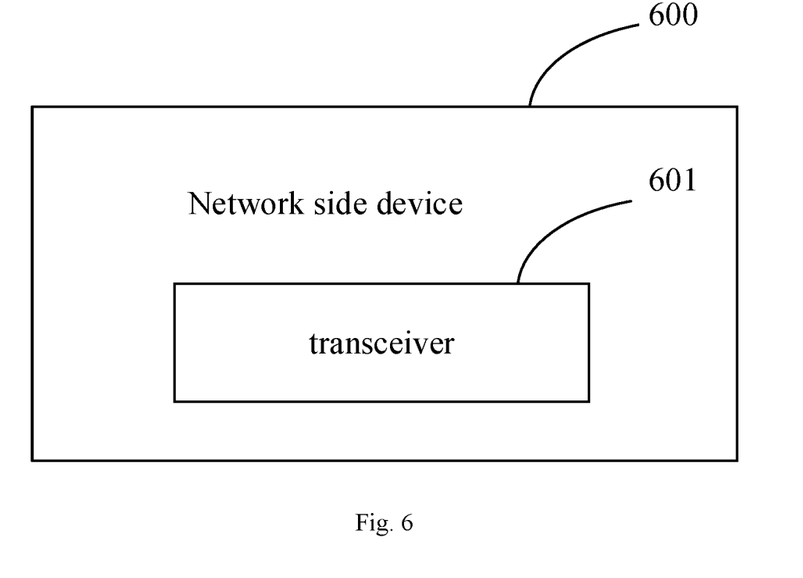
FIG. 6 is another schematic view showing a network side device according to one embodiment of the present disclosure.

FIG. 6 is a schematic structural diagram of a network side device according to an embodiment of the present disclosure. The network side device 600 includes a transceiver 601 for receiving the information of frequency domain location where the UE is located recorded by the UE and/or the frequency domain location information where the UE is currently located reported by the UE.

In the embodiment of the present disclosure, the specific information of frequency domain location where the UE is located reported by the UE is received, a more accurate frequency domain location may be indicated for a cell with an ultra-large bandwidth. It can further help the network understand the specific location of coverage and load related issues.

In the first optional implementation, the transceiver 601 is configured to send first report request information to the UE, and the first report request information is used to notify the UE to report the information of frequency domain location recorded by the UE; receive the information of frequency domain location recorded by the UE reported by the UE according to the first report request information.

In a second optional implementation, the transceiver 601 is configured to receive the information of frequency domain location recorded by the UE actively reported by the UE.

In a third optional implementation, the transceiver 601 is configured to receive a notification message sent by the UE, and where the notification message is used to inform the network side device that the UE has recorded the information of frequency domain location where the UE is located; send second report request information to the UE according to the notification message, where the second report request information is used to notify the UE to report the information of frequency domain location recorded by the UE; receive the information of frequency domain location recorded by the UE and sent by the UE according to the second report request information.

Specifically, the transceiver 601 is configured to receive the information of frequency domain location where the UE is located recorded by the UE and reported by the UE and/or the information of frequency domain location where the UE is currently located and the measurement information reported by the UE. The measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Specifically, the above information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

The network side device provided in this embodiment is based on the same concept as the above embodiment. Therefore, please refer to the above embodiment for the specific working process, principle, and beneficial effects, which will not be repeated herein.

Figure 7:
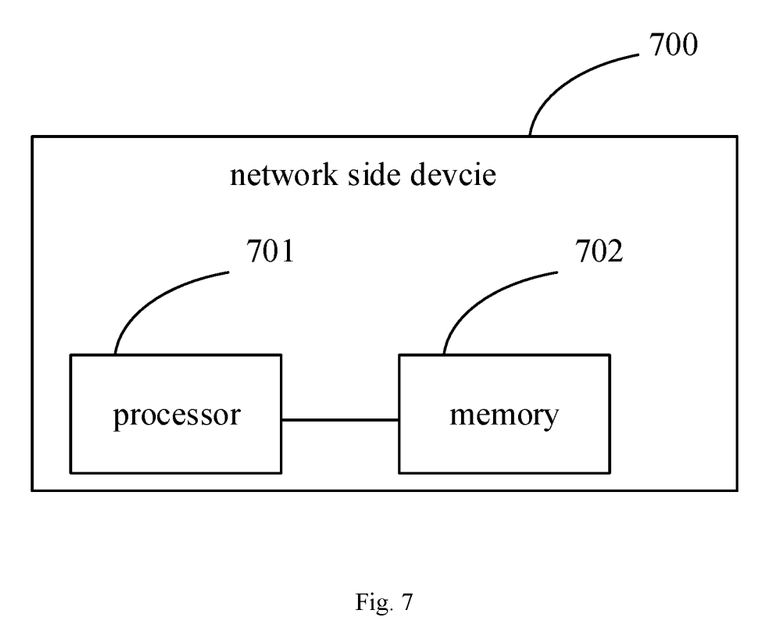
FIG. 7 is yet another schematic view showing a network side device according to one embodiment of the present disclosure.

FIG. 7 is a schematic structural diagram of a network side device according to an embodiment of the present disclosure. The network side device 700 includes a processor 701, a memory 702, and computer program stored on the memory 702 and executed by the processor 701 to implement the step of sending send configuration information to a UE, where the configuration information is used to configure a record of the UE and/or report information of a frequency domain location where the UE is located.

In the embodiments of the present disclosure, for an ultra-large bandwidth cell, a more accurate frequency domain location can be obtained through the recording and reporting by the UE, which can further facilitate the network to understand the specific location where coverage and load related issues occur.

Optionally, the information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of a sending location of RMSI, an offset relative to the start location of the sending location of RMSI, Absolute Radio Frequency Channel Number (ARFCN) of frequency domain location, Enhanced Absolute Radio Frequency Channel Number (E-ARFCN) of frequency domain location, and an offset relative to a sending location of Channel State Information Reference Signal (CSI-RS).

Optionally, the configuration information is also used to configure the UE to record and/or report the measurement information obtained by the UE through measurement.

The foregoing measurement information in the embodiments of the present disclosure may include at least one of: a cell identity of a current cell and/or a neighboring cell; a cell measurement result of the current cell and/or the neighboring cell that may specifically include RSRP and RSRQ, etc.; location information of the UE that may specifically include detailed location information such as radio frequency fingerprints and GPS; a time stamp for recording the measurement information; a data packet delay; a log end time; a number of transmitted preambles.

The specific working process is the same as that in the corresponding embodiment, so it will not be repeated here. Please refer to the description of the method steps in the corresponding embodiment.

Figure 8:
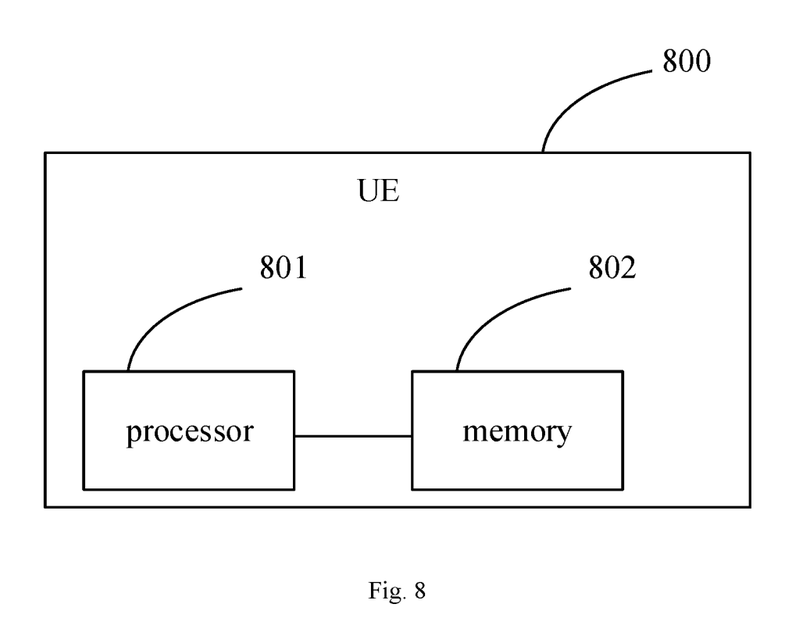
FIG. 8 is another schematic view showing a UE according to one embodiment of the present disclosure.

FIG. 8 is a schematic structural diagram of a UE according to an embodiment of the present disclosure. The UE 800 includes a processor 801, a memory 802, and computer program stored on the memory 802 and executed by the processor 801, so as to implement the following steps: reporting information of frequency domain location where the UE is located recorded by the UE and/or information of frequency domain location where the UE is currently located to the network side device.

Optionally, the following steps may be implemented when the computer program is executed by the processor 801: recording the information of frequency domain location where the UE is located when the UE is in an idle state or an inactive state; reporting the recorded information of frequency domain location where the UE is located to the network side device through uplink signaling, the uplink signaling being a radio resource control (RRC) message, or a medium access control (MAC) message, or other messages other than the RRC message and the MAC message; or reporting the recorded information of frequency domain location where the UE is located to the network side device when the UE enters the connected state from the idle state or the inactive state, or in the procedure of transitioning to the connected state.

Optionally, the following steps may be implemented when the computer program is executed by the processor 801: obtaining measurement information through measurement; reporting the information of frequency domain location where the UE is located recorded by the UE and/or the information of frequency domain location where the UE is currently located to the network side device, and reporting the measurement information.

Optionally, the above-mentioned measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Specifically, the above information of frequency domain location may be represented by many ways, for example may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

Optionally, the following steps may be implemented when the computer program is executed by the processor 801: receiving configuration information sent by the network side device, where the configuration information is used to configure the UE to record and/or report the information of frequency domain location where the UE is located.

Optionally, the following steps may be implemented when the computer program is executed by the processor 801: receiving first report request information from the network side device, the first report request information is used to notify the UE to report the information of frequency domain location recorded by the UE, and sending the frequency domain location information recorded by the UE to the network side device according to the first report request information.

Optionally, the following steps may be implemented when the computer program is executed by the processor 801: actively reporting the information of frequency domain location where the UE is located recorded by the UE to the network side device.

Optionally, the following steps may be implemented when the computer program is executed by the processor 801: sending a notification message to the network side device, the notification message is used to inform the network side device that the UE has recorded the information of frequency domain location where the UE is located; receiving second report request information sent by the network side device according to the notification message, where the second report request information is used to notify the UE to report the information of frequency domain location where the UE is located recorded by the UE; sending the information of frequency domain location where the UE is located recorded by the UE to the network side device according to the second report request information.

The specific working process is the same as that in the above-mentioned corresponding embodiment, so it will not be repeated here. Please refer to the description of the method steps in the above-mentioned corresponding embodiment.

Figure 9:
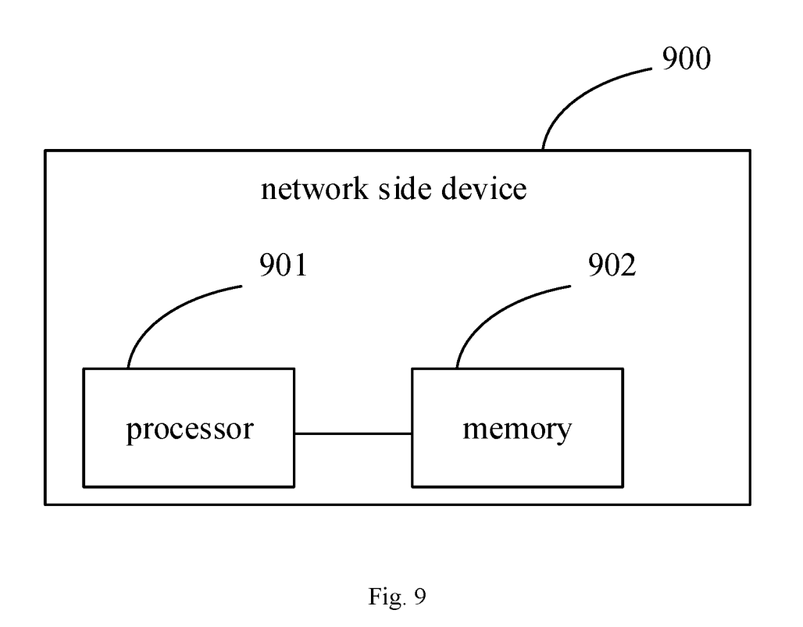
FIG. 9 is still yet another schematic view showing a network side device according to one embodiment of the present disclosure.

FIG. 9 is a schematic structural diagram of a network side device according to embodiment of the present disclosure. The network side device 900 includes a processor 901, a memory 902, and computer program stored in the memory 902 and executed by the processor 901 to implement the following steps: receiving the information of frequency domain location where the UE is located recorded by the UE and/or the frequency domain location information where the UE is currently located reported by the UE.

Optionally, the following steps may be implemented when the computer program is executed by the processor 901: sending first report request information to the UE, and the first report request information is used to notify the UE to report the information of frequency domain location recorded by the UE; receiving the information of frequency domain location recorded by the UE reported by the UE according to the first report request information.

Optionally, the following steps may be implemented when the computer program is executed by the processor 901: receiving the information of frequency domain location recorded by the UE actively reported by the UE.

Optionally, the following steps may be implemented when the computer program is executed by the processor 901: receiving a notification message sent by the UE, and where the notification message is used to inform the network side device that the UE has recorded the information of frequency domain location where the UE is located; sending second report request information to the UE according to the notification message, where the second report request information is used to notify the UE to report the information of frequency domain location recorded by the UE; receiving the information of frequency domain location recorded by the UE and sent by the UE according to the second report request information.

Optionally, the following steps may be implemented when the computer program is executed by the processor 901: receiving the information of frequency domain location where the UE is located recorded by the UE and reported by the UE and/or the information of frequency domain location where the UE is currently located and the measurement information reported by the UE. The measurement information includes at least one of: a cell identity of a current cell and/or a neighboring cell; a cell measurement result of the current cell and/or the neighboring cell; location information of the UE; a time stamp for recording the measurement information; a data packet delay; a log end time; a number of transmitted preambles.

Specifically, the above information of frequency domain location may be at least one of: an offset relative to a center frequency point of carrier frequencies, an offset relative to a starting location of the carrier frequencies, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

The specific working process is the same as that in the corresponding embodiment above, so it will not be repeated here. Please refer to the description of the method steps in the corresponding embodiment.

An embodiment of the present disclosure provides a computer-readable storage medium on which a computer program is stored. When the computer program is executed by a processor, it can realize the steps in the information reporting configuration method in the above embodiment, or realize the steps in the information reporting method in the above embodiment. The specific working process is the same as the above corresponding embodiment, so it will not be repeated here. Please refer to the description of the method steps in the above corresponding embodiment.

The network side device in the embodiment of the present disclosure may be a base station (Base Transceiver Station, BTS) in Global System of Mobile communication (GSM) or Code Division Multiple Access (CDMA), or it may be the base station (NodeB, NB) in Wideband Code Division Multiple Access (WCDMA), or the evolved base station (Evolutional Node B, eNB or eNodeB) in LTE, or a relay station or access point, or a base stations in the future 5G network, which are not limited here.

The UE in the embodiments of the present disclosure may be a wireless UE or a wired UE. A wireless UE may be a device that provides voice and/or other service data connectivity to users, a handheld device with wireless connection function, or other processing device connected to a wireless modem. A wireless UE can communicate with one or more core networks via a radio access network (Radio Access Network, RAN). The wireless UE can be a mobile UE, such as a mobile phone (or "cellular" phone) and a computer with a mobile UE. For example, they can be portable, pocket-sized, handheld, computer build-in or vehicle-mounted mobile devices, which exchange language and/or data with the wireless access network. For example, they are personal communication service (PCS) phones, cordless phones, Session Initiation Protocol (SIP) phones, wireless local loop (Wireless Local Loop, WLL) stations, and personal digital assistants (Personal Digital Assistant, PDA) and other devices. Wireless UE can also be called as a system, subscriber unit, subscriber station, mobile station, Mobile, remote station, remote UE, access terminal, User Agent, User Device or User Equipment, which are not limited here.

The above-mentioned computer-readable media include permanent and non-permanent, removable and non-removable media, and information storage can be realized by any method or technology. The information can be computer readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM, digital versatile disc (DVD) or other optical storage, Magnetic cassettes, magnetic tape, magnetic disk or other magnetic storage devices or any other non-transmission media can be used to store information that can be accessed by computing devices.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information reporting method applied to a user equipment (UE), comprising:
obtaining measurement information through measurement, wherein the measurement information includes a number of transmitted preambles;

reporting information, recorded by the UE, of a frequency domain location where the UE is located during the measurement to the network side device;
wherein the reporting information, recorded by the UE, of the frequency domain location where the UE is located during the measurement to the network side device comprises:
reporting the measurement information in a report and reporting the information, recorded by the UE, of the frequency domain location where the UE is located during the measurement to the network side device in the same report.

2. The information reporting method according to claim 1, wherein before the reporting information, recorded by the UE, of a frequency domain location where the UE is located during the measurement to the network side device, the method further comprises:
reporting the recorded information of the frequency domain location where the UE is located to the network side device through uplink signaling, wherein the uplink signaling is a radio resource control (RRC) message, or a medium access control (MAC) message, or other messages other than the RRC message and the MAC message; or
reporting the recorded information of the frequency domain location where the UE is located to the network side device after the UE enters a connected state from an idle state or an inactive state, or in a procedure of transitioning to the connected state.

3. The information reporting method according to claim 1, wherein the measurement information further includes at least one of: a cell identity of at least one of a current cell or a neighboring cell; a cell measurement result of at least one of the current cell or the neighboring cell; location information of the UE; a time stamp for recording the measurement information; a data packet delay; a log end time.

4. The information reporting method according to claim 1, wherein the information of the frequency domain location is at least one of:
an offset relative to a center frequency point of carrier frequencies, an offset relative to a starting or lowest location of the carrier frequencies, an offset relative to a starting or lowest location of the bandwidth parts, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of Remaining Minimal System Information (RMSI), an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

5. The information reporting method according to claim 1, wherein before the reporting information, recorded by the UE, of a frequency domain location where the UE is located during the measurement to the network side device, the method further comprises:
receiving configuration information sent by the network side device, wherein the configuration information is used for at least one of following:
configuring the UE to record information of the frequency domain location where the UE is located, or
configuring the UE to report the information of the frequency domain location where the UE is located.

6. The information reporting method according to claim 1, wherein the reporting the information, recorded by the UE, of a frequency domain location where the UE is located during the measurement to the network side device comprises:
receiving first report request information from the network side device, wherein the first report request information is used to notify the UE to report the information of the frequency domain location where the UE is located recorded by the UE;
sending the information of the frequency domain location where the UE is located recorded by the UE to the network side device according to the first report request information.

7. The information reporting method according to claim 1, wherein the reporting the information, recorded by the UE, of a frequency domain location where the UE is located during the measurement to the network side device comprises:
sending a notification message to the network side device, wherein the notification message is used to inform the network side device that the UE has recorded the information of the frequency domain location where the UE is located;
receiving second report request information sent by the network side device according to the notification message, wherein the second report request information is used to notify the UE to report the information of the frequency domain location where the UE is located recorded by the UE;
sending the information of the frequency domain location where the UE is located recorded by the UE to the network side device according to the second report request information.

8. An information reporting method applied to a network side device, comprising:
receiving information, recorded by a UE, of a frequency domain location where the UE is located during measurement reported by the UE,
wherein the receiving the information, recorded by the UE, of the frequency domain location where the UE is located during the measurement comprises:
receiving measurement information in a report reported by the UE and receiving the information, recorded by the UE, of the frequency domain location where the UE is located during the measurement in the same report,
wherein the measurement information includes a number of transmitted preambles.

9. The information reporting method according to claim 8, wherein the receiving the information, recorded by a UE, of a frequency domain location where the UE is located during measurement and reported by the UE comprises:
sending first report request information to the UE, wherein the first report request information is used to notify the UE to report the information of the frequency domain location where the UE is located recorded by the UE;
receiving the information of the frequency domain location where the UE is located recorded by the UE and reported by the UE according to the first report request information.

10. The information reporting method according to claim 8, wherein the receiving the information, recorded by a UE, of a frequency domain location where the UE is located during measurement and reported by the UE comprises:
   receiving a notification message sent by the UE, wherein the notification message is used to inform the network side device that the UE has recorded the information of the frequency domain location where the UE is located;
   sending second report request information to the UE according to the notification message, wherein the second report request information is used to notify the UE to report the information of the frequency domain location recorded by the UE;
   receiving the information of the frequency domain location recorded by the UE and sent by the UE according to the second report request information.

11. The information reporting method according to claim 8, wherein the information of the frequency domain location is at least one of:
   an offset relative to a center frequency point of carrier frequencies, an offset relative to a starting or lowest location of the carrier frequencies, an offset relative to a starting or lowest location of the bandwidth parts, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

12. An information reporting configuration method applied to a network side device, comprising:
   sending configuration information to a UE, wherein the configuration information is used for at least one of following: configuring the UE to record information of a frequency domain location where the UE is located during measurement, or configuring the UE to report information of a frequency domain location where the UE is located during the measurement in a report;
   wherein the configuration information is further used for at least one of following:
      configuring the UE to record measurement information obtained by the UE through the measurement, or
      configuring the UE to report measurement information obtained by the UE through the measurement in the same report;
   wherein the measurement information includes a number of transmitted preambles.

13. The information reporting configuration method according to claim 12, wherein the information of the frequency domain location is at least one of:
   an offset relative to a center frequency point of carrier frequencies, an offset relative to a starting or lowest location of the carrier frequencies, an offset relative to a starting or lowest location of the bandwidth parts, a sending location of the cell defining SS/PBCH block, an offset relative to the sending location of the cell defining SS/PBCH block, a sending location of other SS/PBCH block other than the cell defining SS/PBCH block, an offset relative to the sending location of other SS/PBCH block other than the cell defining SS/PBCH block, a center frequency point of a sending location of RMSI, an offset relative to the center frequency point of the sending location of RMSI, an offset relative to a start location of the sending location of RMSI, ARFCN of frequency domain location, E-ARFCN of frequency domain location, and an offset relative to a sending location of a certain CSI-RS.

14. The information reporting configuration method according to claim 12, wherein the measurement information further comprises at least one of:
   a cell identity of at least one of a current cell or a neighboring cell;
   a cell measurement result of at least one of the current cell or the neighboring cell;
   location information of the UE;
   a time stamp for recording the measurement information;
   a data packet delay;
   a log end time.

15. A UE, comprising a processor, and a memory storing therein a computer program, wherein the computer program is executed by the processor so as to implement the information reporting method according to claim 1.

16. A network side device, comprising a processor, and a memory storing therein a computer program, wherein the computer program is executed by the processor so as to implement the information reporting method according to claim 8.

17. A network side device, comprising a processor, and a memory storing therein a computer program, wherein the computer program is executed by the processor so as to implement the information reporting method according to claim 12.

* * * * *